UNITED STATES PATENT OFFICE.

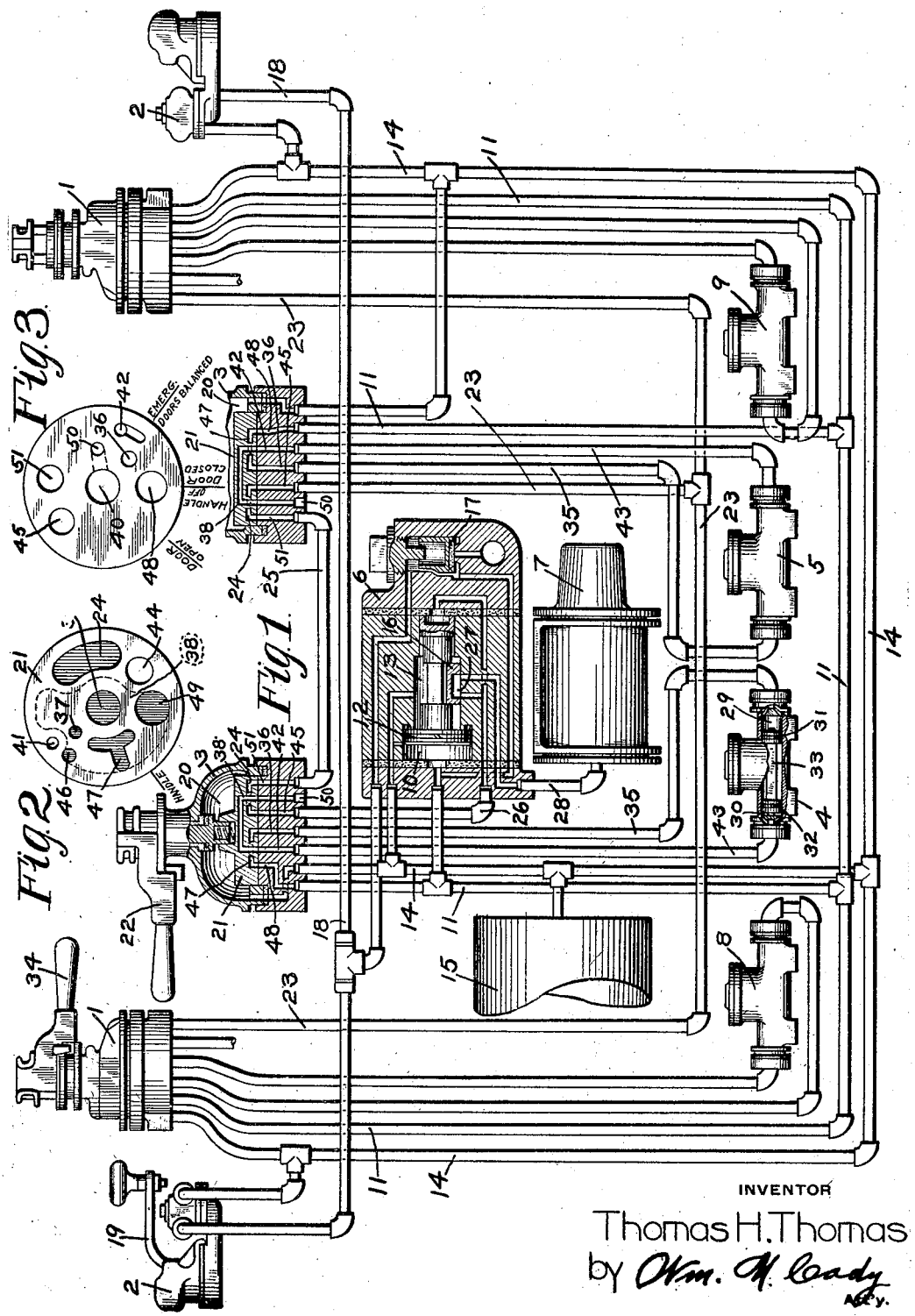

THOMAS H. THOMAS, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

CAR-DOOR AND BRAKE CONTROL DEVICE.

1,346,859.    Specification of Letters Patent.    Patented July 20, 1920.

Application filed June 4, 1919. Serial No. 301,778.

*To all whom it may concern:*

Be it known that I, THOMAS H. THOMAS, a citizen of the United States, residing at Edgewood, in the county of Allegheny and State of Pennsylvania, have invented new and useful Improvements in Car-Door and Brake Control Devices, of which the following is a specification.

This invention relates to apparatus for controlling the brakes and the car doors and steps on traction cars.

Where the car doors and steps are adapted to be controlled by the conductor, such as on a center entrance car, for example, there is the possibility of an accident, if the conductor should open the door while the car is running, particularly at a high speed.

One object of my invention is to provide a car door and brake controlling apparatus under the control of the conductor and adapted to cause the brakes to be applied whenever the conductor manipulates the apparatus to open a car door.

Another object of my invention is to provide a car door and brake controlling apparatus in which the brakes are applied when the conductor operates the apparatus to open a car door and having means for preventing the brakes from being released by the motorman until the car door is closed.

Other objects and advantages will appear in the following more detailed description of the invention.

In the accompanying drawings; Figure 1 is a diagrammatic view, partly in section, of a car door and brake controlling apparatus, with my invention embodied therein; Fig. 2 a face view of the rotary valve of the conductor's controlling valve device, showing the ports and passages therein; and Fig. 3 a plan view of the valve seat for said rotary valve.

As shown in Fig. 1 of the drawing, the car door and brake controlling apparatus may comprise at each end of the car a motorman's brake valve device 1 and a controller handle device 2 having the feature of applying the brakes when the hand is removed from the controller handle.

At the center of the car and on each side, where there is a door on each side, a conductor's car door and brake controlling valve 3 is provided, one brake valve for controlling a door engine 4 for operating the car door at one side of the car and the other brake valve, a door engine 5 for operating the car door at the other side of the car.

Both of the conductor's brake valves are connected by piping to operate an emergency valve device 6 for controlling the admission and release of fluid under pressure to and from a brake cylinder 7.

The motorman's brake valve 1 at one end of the car controls a door engine 8 for operating a car door at that end of the car and the other motorman's brake valve 1 controls a door engine 9 for operating the car door at the other end of the car.

The emergency valve device 6 may comprise a casing having a piston chamber 10 connected to the emergency brake pipe 11 and containing piston 12 and having a valve chamber 13 connected to pipe 14 leading to the main reservoir 15 or other source of fluid pressure supply and containing slide valve 16.

The emergency valve device may also include a relay valve device 17, adapted to be controlled through the safety control pipe 18 by the operation of the usual pilot valve at the controller when the hand is removed from the controller handle 19.

The conductor's brake valve 3 may comprise a casing having a valve chamber 20 connected to the main reservoir pipe 14 and containing a rotary slide valve 21 adapted to be operated by handle 22.

A straight air pipe 23 is connected to both of the motorman's brake valves 1, and is also connected to one of the conductor's brake valves 3, such as the one at the right of the drawing.

In the door closed and handle off position, a cavity 24 in the rotary valve 21 connects the pipe 23 with pipe 25 leading to the other brake valve device 3, in which brake valve the same cavity 24 connects the pipe 25 with pipe 26, leading, through cavity 27 in the slide valve 16 of the emergency valve device 6, to pipe 28 and brake cylinder 7.

The door engine 4 as well as the other door engines may comprise a casing having piston chambers 29 and 30 containing the respective pistons 31 and 32 connected by piston stem 33 and adapted to control one of the car doors.

In operation, when the motorman's brake valve 1 at the operating end of the car is in running position, fluid is supplied from the main reservoir 15 through ports in the brake valve to the emergency brake pipe 11 and thence flows to the piston chamber 10 of the emergency valve device 6, thus balancing the main reservoir pressure acting on the opposite side of said piston, so that the piston and the slide valve 16 are maintained in release position, as shown in Fig. 1 of the drawing.

If the motorman desires to make a straight air application of the brakes, he turns the brake valve handle 34 to straight air application position, in which fluid under pressure is supplied to the straight air pipe 23 and flows thence through the cavity 24 in the rotary valve of the conductor's brake valve at the right of the drawing to pipe 25, and through cavity 24 of the other conductor's brake valve to pipe 26, and thence through cavity 27 of the slide valve 16 to pipe 28 and the brake cylinder 7.

If the conductor desires to open one of the center entrance doors, he turns the conductor's valve handle 22, at the side of the car at which he may be stationed to the door open position, in which piston 31 of the door engine 4, assuming that the conductor's valve at the left of the drawing is being operated, is connected to the exhaust through pipe 35, port 36 in the rotary valve seat, and port opening 37 in the rotary valve 21, which communicates, by way of the cavity 38 and port opening 39, with exhaust port 40.

It may be stated here, that the port connections in the section of the conductor's brake valve in Fig. 1 are shown diagrammatically, so as to avoid confusion and show clearly how the air flows; the true size and relative relation of the ports and passages being shown in Figs. 2 and 3.

The door opening piston 32 of the door engine 4 is supplied with fluid under pressure from rotary valve chamber 20 through port 41 in rotary valve 21 which registers with an extension of the door opening port 42, and thence fluid flows through pipe 43 to piston 32.

In this position of the conductor's brake valve, port 44 in the rotary valve 21 registers with port 45, so that fluid is supplied through pipe 26 to the brake cylinder 7 to effect a straight air application of the brakes, from which it will be seen that the conductor cannot open the car door without making an application of the brakes.

It will also be noted that the movement of the conductor's valve to open the door cuts off communication from pipe 25 to pipe 26, so that the motorman cannot release the brakes so long as the conductor's valve remains in the door open position, with the car door open.

Furthermore, since the brakes are applied when the car door is opened, the car will be brought to a stop or at least the speed of the car will be materially reduced.

When the conductor moves the brake valve handle 22 to the door closed position in order to close the car door, the pipe 43 is connected to the exhaust through port 42, port opening 46 in the rotary valve 21 and thence through cavity 38 to exhaust port 40.

The pipe 35 is connected to the emergency brake pipe 11 through port 36, cavity 47 in the rotary valve 21, and port 48, so that fluid from the emergency brake pipe is supplied to the door closing piston 31 of the door engine to effect the closing of the car door.

In this position, communication is again opened from pipe 25 to pipe 26, through port 51, cavity 24 in the rotary valve 21, and port 45, so that the motorman can now control the application and release of the brakes in the usual manner.

The conductor may also effect an emergency application of the brakes by turning the handle 22 to emergency position, in which the emergency brake pipe 11 is connected to the exhaust through port 48, port opening 49 in the rotary valve 21, and thence through cavity 38 to exhaust port 40.

The reduction in brake pipe pressure which is thus produced, causes the movement of piston 12 and slide valve 16 of the emergency valve device to emergency application position, in which fluid is supplied from valve chamber 13 to the brake cylinder 7, to effect an emergency application of the brakes.

In the emergency position of the conductor's brake valve, the cavity 47 connects both the door opening port 42 and the door closing port 36 with a port 50, which leads to exhaust port 40, so that both of the pistons 31 and 32 of the door engines are subjected to atmospheric pressure, thus balancing the fluid pressures on the pistons, so that while the car door is not opened, it may be readily opened by a passenger, since the door is not then held in closed position by fluid pressure.

Having now described my invention, what I claim as new, and desire to secure by Letters Patent, is:—

1. In a car door and brake controlling apparatus, the combination with a brake valve operated by the motorman for controlling one car door and the brakes, of an additional brake valve operated by the conductor for controlling another car door and the brakes.

2. In a car door and brake controlling apparatus, the combination with a brake valve operated by the motorman for controlling the end car doors and the brakes, of an additional brake valve operated by the conductor for controlling the center car doors and the brakes.

3. In a brake controlling apparatus, the combination with a brake valve operated by the motorman for controlling the brakes, of valve means controlled by the conductor for controlling communication through which the brakes are controlled by the motorman's brake valve.

4. In a brake controlling apparatus, the combination with a brake valve operated by the motorman for applying and releasing the brakes, of an additional brake valve operated by the conductor for controlling communication through which the brakes are applied and released by the motorman's brake valve.

5. In a fluid pressure brake apparatus, the combination with a brake cylinder, of a motorman's brake valve for supplying and releasing fluid to and from the brake cylinder and an additional brake valve operated by the conductor for cutting off communication through which fluid is supplied and released to and from the brake cylinder by operation of the motorman's brake valve.

6. In a car door and brake controlling apparatus, the combination with a brake valve operated by the motorman for controlling the brakes, of a brake valve operated by the conductor for controlling the brakes and a car door and having a position for opening the car door and applying the brakes.

7. In a car door and brake controlling apparatus, the combination with a brake valve operated by the motorman for controlling the brakes, of an additional brake valve normally establishing communication through which the motorman's brake valve controls the brakes and operated by the conductor for controlling a car door and the brakes and having a position in which said communication is cut off, the car door is opened, and the brakes are applied.

8. In a fluid pressure brake apparatus, the combination with a brake valve operated by the motorman for controlling the brakes, of two additional brake valves each adapted to be operated by the conductor and both conductor's brake valves adapted to normally establish communication through which the brakes are controlled by the motorman's brake valve, the movement of either conductor's brake valve being adapted to close said communication.

9. In a fluid pressure brake apparatus, the combination with a brake cylinder, a straight air pipe and a brake valve operated by the motorman for supplying and releasing fluid through the straight air pipe to and from the brake cylinder, of a brake valve operated by the conductor and normally establishing communication from the motorman's brake valve through the straight air pipe to the brake cylinder and adapted in another position to cut off said communication.

10. In a fluid pressure brake apparatus, the combination with a brake cylinder, a straight air pipe and a brake valve operated by the motorman for supplying and releasing fluid through the straight air pipe to and from the brake cylinder, of a brake valve operated by the conductor and normally establishing communication from the motorman's brake valve through the straight air pipe to the brake cylinder and having a position for opening a car door and applying the brakes and in which said communication is closed.

11. In a car door and brake controlling apparatus, the combination with a motorman's brake valve for controlling the brakes, of an additional brake valve operated by the conductor for controlling a car door and means controlled by the conductor's valve for effecting an emergency application of the brakes.

12. In a car door and brake controlling apparatus, the combination with a motorman's brake valve for controlling the brakes, of means for effecting an emergency application of the brakes and an additional brake valve operated by the conductor for controlling a car door and adapted in one position to effect the operation of said means.

In testimony whereof I have hereunto set my hand.

THOMAS H. THOMAS.